US006942205B2

(12) United States Patent
Carlstedt et al.

(10) Patent No.: US 6,942,205 B2
(45) Date of Patent: Sep. 13, 2005

(54) SPIRAL ROLLED LAMINATED BUSHING

(75) Inventors: Robert P. Carlstedt, Rochester Hills, MI (US); Daniel E. Whitney, Arlington, MA (US); Mark C. Smith, Troy, MI (US); Eric Stephen Geib, Fenton, MI (US); Steven M. Foster, Rochester, MI (US); Richard M. Clisch, Canton, MI (US); Shan Shih, Troy, MI (US); Juan Jose Marcos Munoz, Navara (ES)

(73) Assignee: Meritor Light Vehicle Technology, LLC, Troy, MI (US)

( * ) Notice: Subject to any disclaimer, the term of this patent is extended or adjusted under 35 U.S.C. 154(b) by 371 days.

(21) Appl. No.: 10/039,093

(22) Filed: Jan. 2, 2002

(65) Prior Publication Data

US 2003/0121122 A1 Jul. 3, 2003

(51) Int. Cl.[7] .................................................. F16L 5/00
(52) U.S. Cl. ........................ 267/282; 16/2.2; 384/276; 384/283; 267/282; 267/269
(58) Field of Search .......................... 16/2.1, 2.2, 2.3, 16/2.9, 2.5; 384/276, 282, 283, 275; 267/270, 282, 269

(56) References Cited

U.S. PATENT DOCUMENTS

| 1,541,276 | A | | 6/1925 | Powell | |
|---|---|---|---|---|---|
| 1,729,328 | A | | 9/1929 | Chilton | |
| 2,001,257 | A | | 5/1935 | Lecler | |
| 2,073,419 | A | | 3/1937 | Houdaille et al. | |
| 2,176,971 | A | * | 10/1939 | Klotsch | 267/33 |
| 2,346,574 | A | | 4/1944 | Guy | |
| 2,358,518 | A | | 9/1944 | Kraft | |
| 2,900,182 | A | * | 8/1959 | Hinks | 267/282 |
| 3,071,422 | A | * | 1/1963 | Hinks | 384/221 |
| 3,235,941 | A | * | 2/1966 | Krotz | 29/898.04 |
| 3,690,639 | A | * | 9/1972 | Brandon et al. | 267/282 |
| 3,750,249 | A | * | 8/1973 | Brandon et al. | 29/898.056 |
| 3,869,113 | A | * | 3/1975 | Dudek | 267/282 |
| 3,998,503 | A | * | 12/1976 | Van Wyk | 384/261 |
| 4,108,508 | A | * | 8/1978 | Clinard, Jr. | 384/221 |
| 4,349,184 | A | * | 9/1982 | Peterson et al. | 267/153 |
| 4,687,223 | A | | 8/1987 | Miyoshi et al. | |
| 4,819,385 | A | | 4/1989 | Baumann et al. | |
| 5,062,193 | A | | 11/1991 | Thompson | |
| 5,332,255 | A | * | 7/1994 | Velazquez | 280/86.754 |
| 5,413,374 | A | | 5/1995 | Pierce | |
| 5,609,353 | A | | 3/1997 | Watson | |
| 6,425,576 | B1 | * | 7/2002 | Choi | 267/273 |

OTHER PUBLICATIONS

European Search Report dated Sep. 15, 2003.

* cited by examiner

Primary Examiner—Suzanne L. Barrett
Assistant Examiner—Mark Williams
(74) Attorney, Agent, or Firm—Carlson, Gaskey & Olds

(57) ABSTRACT

A laminated bushing is formed from a metal sheet having resilient material disposed on one side by spirally winding the metal sheet about a longitudinal axis to form a spirally shaped cavity. The resilient material is disposed within the spirally shaped cavity and the metal sheet forming the spiral shaped cavity either mechanically compresses the resilient material disposed within the cavities, or the resilient material is vulcanized once the laminated bushing is formed. The spirally wound laminated bushing includes inner and outer sleeves concentric about the longitudinal axis that are movable relative to one another in direct proportion to the material deformation properties of the resilient material.

20 Claims, 5 Drawing Sheets

SPIRAL ROLLED LAMINATED BUSHING

BACKGROUND OF THE INVENTION

This invention relates to a resilient joint bushing for use in joining two structural members.

Typically, a bushing is used to connect two structural members that move relative to one anther. Normally, bushings include an inner sleeve of a predetermined diameter secured to one of the structural members and an outer sleeve having a diameter larger then the inner sleeve. In one type of bushing, the inner sleeve is suspended within the outer sleeve in a concentric manner by a resilient and deformable material. The deformable material is typically bonded to both the inner and outer sleeves. The deformable material disposed between the inner and outer sleeves allows a discrete amount of movement. The movement between inner and outer sleeves may be longitudinal or rotational. Such bushings dampen the transmission of vibrations from one structural member to another reducing noise created by such vibrations. This type of bushing does not direct motion between the structural parts.

One other type of bushing is a laminated bushing. Sheets of metal and deformable material are layered to form this type of bushing. The laminated bushing can have greater strength and durability properties than the above-mentioned bushing. Further, laminated bushings may be constructed in a manner that can aid in the direction of movement between structural members. This is accomplished by layering the alternating metal sheets to provide for shear in only desired directions. Laminated bushings however are costly in comparison to typical bushings.

For these reasons, it is desirable to develop a low cost laminated bushing to provide additional strength and durability while providing a cost efficient alternative to conventional bushings.

SUMMARY OF THE INVENTION

One disclosed embodiment of this invention is a laminated bushing formed by spirally winding a metal sheet with a resilient material to provide a range of motion proportional to an applied force.

The laminated bushing includes a metal sheet spirally wound about a first longitudinal axis forming a spirally shaped cavity. A deformable resilient material such as rubber is disposed on one side of the metal sheet and within the cavity. The metal sheet forming the spiral shaped cavity may mechanically compress the resilient material disposed within the cavities. Alternatively, the resilient material can be vulcanized once within the laminated bushing is formed. The spirally wound laminated bushing includes inner and outer sleeves concentric about the longitudinal axis and that move relative to one another in direct proportion to the material deformation properties of the resilient material disposed between the metal sheet. However, because the resilient material is alternatively layered with the metal sheet the direction of movement between the inner sleeve and the outer sleeve is controlled by the specific configuration of the laminated bushing.

The configuration of the laminated bushing can be adapted to provide various directions of movement between two fastened structural members. In one embodiment, the inner sleeve is concentric with the outer sleeve. The outer sleeve forms a continuous cylinder and movement of the inner sleeve relative to the outer sleeves can occur in many planes.

In another embodiment, the laminated bushing includes a plurality of grooves disposed annularly about the longitudinal axis. Movement of the resilient material is resisted at a greater rate in a direction across or perpendicular to the grooves. In this way the grooves can be configured to direct motion between the two structural members by increasing resistance to movement across the grooves. Further embodiments include grooves that are disposed along the longitudinal axis, and grooves that are spirally wound about longitudinal axis.

The invention includes the method of constructing a spirally wound bushing including the steps of bonding a resilient deformable material to a least one side of a metal sheet, then rolling the metal sheet over itself about a longitudinal axis such that a plurality of spirally wound cavities are formed. The method further includes forming the spirally wound cavities such that the resilient deformable material is compressed within the spiral cavities.

The laminated bushing of the subject invention provide the benefits of increased strength and durability along with providing a means of directionally controlling movement of a structural member.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
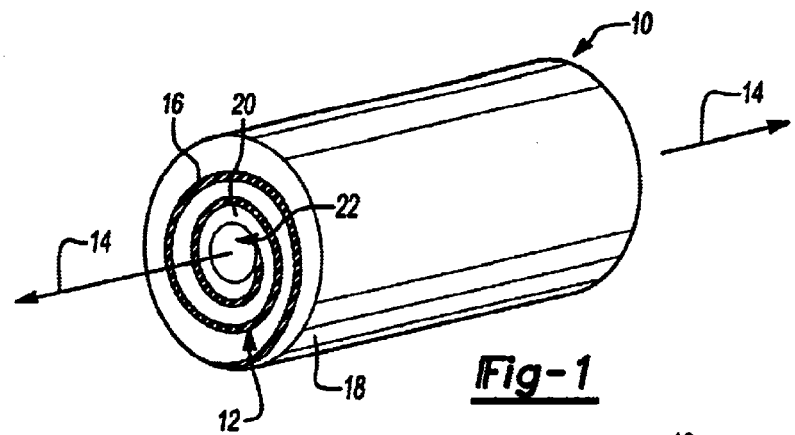
FIG. 1 is a perspective view of a spirally wound laminated bushing.

Referring to the FIGS., wherein like numerals indicate like or corresponding parts throughout the several views and embodiments, a laminated bushing generally indicated at 10 is shown in FIG. 1. The laminated bushing 10 includes a metal sheet 12 spirally wound about a longitudinal axis 14 to form a spirally shaped cavity 20. A resilient material 16 such as rubber is disposed between the metal sheet 12 and within the spiral shaped cavity 20. Preferably, the resilient material 16 is mechanically compressed between the metal sheets 12. Alternatively, the resilient material 16 can be rubber that is vulcanized after formation of the luminated bushing 10. It should be understood that the resilient material 16 could be of any type known in the art. Preferably, the inner sleeve 22 is rotatable relative to an outer sleeve 18 in a proportional manner related to the specific material properties of the resilient material 16. The spirally wound metal sheet 12 is inserted into the outer sleeve 18. The inner sleeve 22 is formed concentric with the outer sleeve 18 about the longitudinal axis 14. The inner sleeve 22 is movable along the longitudinal axis 14 relative to the outer sleeve 18 in a proportional manner dependent on the specific properties of the resilient material 16.

Figure 2:
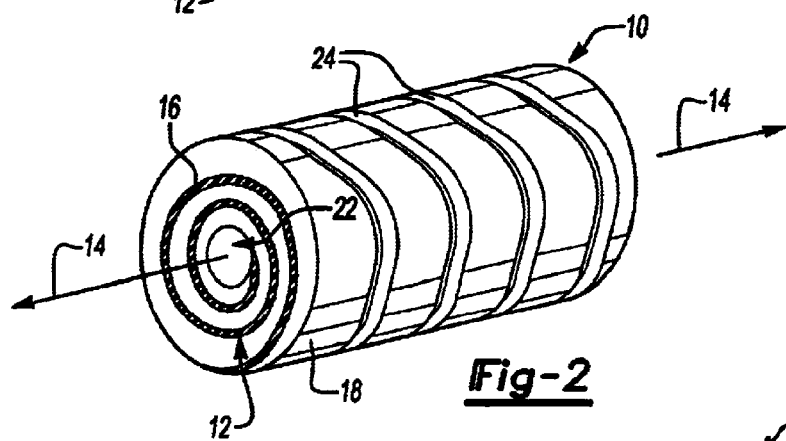
FIG. 2 is a perspective view of another embodiment of the laminated bushing including annular grooves.

Referring to FIG. 2, another embodiment of the laminated bushing includes a plurality of mechanically formed grooves 24. The grooves 24 are formed at intervals along the longitudinal axis 14 of the laminated bushing 10. Preferably, the grooves 24 are part of the metal sheet and become an integral part of the laminated bushing throughout the entire laminated bushing 10. The grooves 24 direct movement of the inner sleeve 22 relative to the outer sleeve 18 by increasing the resistance to movement in a direction across or perpendicular to the grooves 24. The grooves 24 increase resistance of the resilient material 16 in a direction perpendicular to the grooves 24. In this embodiment the grooves 24 are arranged at intervals about the longitudinal axis 14 to increase resistance to movement of the inner sleeve 22 along the longitudinal axis 14 relative to the outer sleeve 18.

Figure 3:
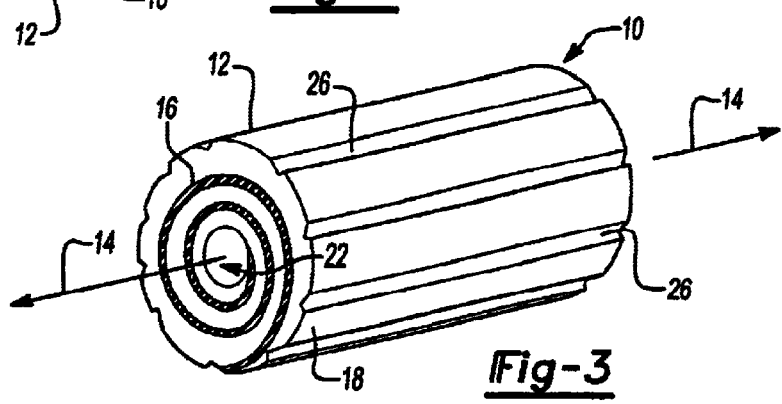
FIG. 3 is a perspective view of another embodiment of the laminated bushing with longitudinal grooves.

Referring to FIG. 3, another embodiment including a plurality of grooves 26 is disclosed. In this embodiment, the grooves 26 are positioned longitudinally throughout the entire laminated bushing 10. The grooves 26 are formed within the metal sheet 12 to direct movement of the inner sleeve 22 relative to the outer sleeve 18 by increasing resistance to motion perpendicular to the grooves 26. The grooves 26 are disposed longitudinal to resist rotational movement of the inner sleeve 22 relative to the outer sleeve 18 thereby encouraging movement along the longitudinal axis 14. Movement along the longitudinal axis 14 would be such that the inner sleeve 22 moves in a telescoping motion relative to the outer sleeve 18.

Figure 4:
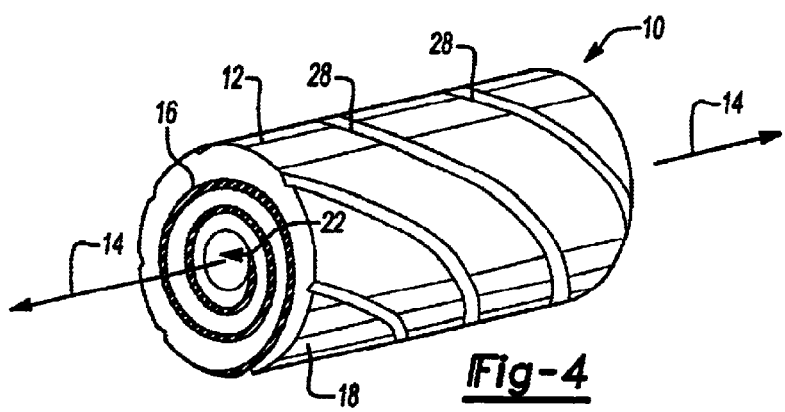
FIG. 4, is another embodiment of the laminated bushing including spiral grooves.

Referring to FIG. 4, another embodiment of the laminated bushing 10 is shown. The laminated bushing includes a plurality of spirally wound grooves 28 within the metal sheet 12 such that the resilient material 16 is directed for both rotational and axial movement. The spirally wound grooves 28 direct the inner sleeve 22 to rotate about the longitudinal axis 14 in proportion to movement along the longitudinal axis 14. The spirally wound grooves 28 direct movement of the inner sleeve 22 relative to the outer sleeve 18 along the longitudinal axis 14 in proportion to rotation about the longitudinal axis 14. In other words, the inner sleeve 22 has a lower resistance to movement in a telescoping, rotational manner relative to the outer sleeve 18.

The laminated bushings 10 enable control of the direction of motion by using alternating layers of metal sheet 12 and resilient material 16 with or without the formed geometry. The embodiments of the laminated bushing described and shown in FIGS. 1–4 are only examples of various geometric configurations integrally formed to the laminated bushing 10 to control motion of the inner sleeve 22 relative to the outer sleeve 18. It should be understood that it is within the contemplation of this invention that the grooves may be of any configuration known to a worker skilled in the art such that the direction of motion can be controlled dependent on a specific application. The laminated bushing 10 can be incorporated into any application in which bushings are currently being used such as for joining of various suspension components.

Figure 5:
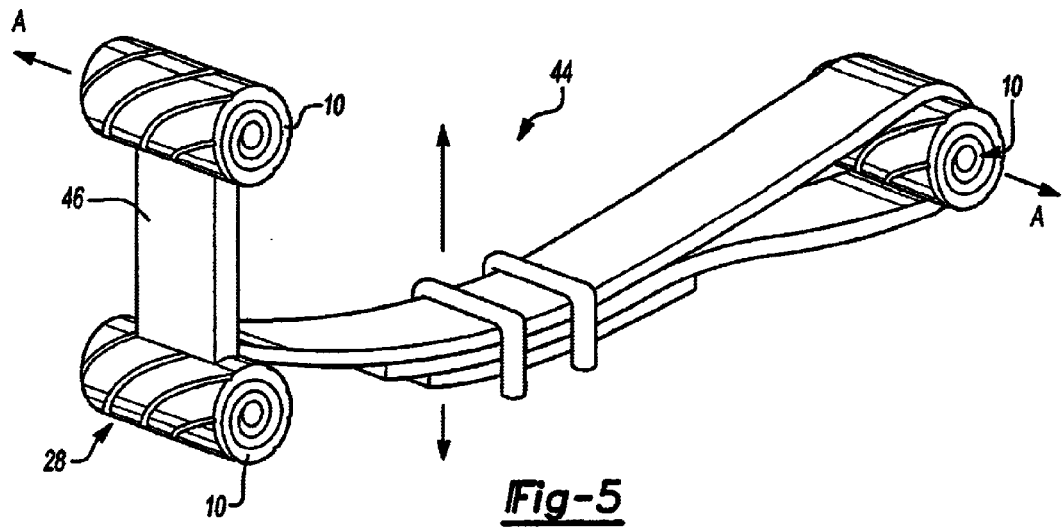
FIG. 5 is a perspective view of the spirally wound laminated bushing installed in a leaf spring bracket assembly.

Referring to FIG. 5, a leaf spring assembly 44 is shown including the laminated bushings 10 having spirally wound grooves 28. The laminated bushings 10 enable control of the direction of motion to assist in the changing wheel alignment by changing chamber, castor, toe and the like. The laminated bushings 10 are part of the mounting bracket 46 and move proportionally in response to compression of the leaf spring assembly 44. Movement of the leaf spring assembly 44 can be used to direct movement of the leaf spring assembly 44 to adjust over-steer or under-steer. The laminated bushings 10 are arranged such that compression of the leaf spring 44 moves the rear bushing in one direction and moves the front bushing in the opposite direction to provide a pivoting movement of the entire leaf spring assembly 44 as shown by the arrows A.

Figure 6:
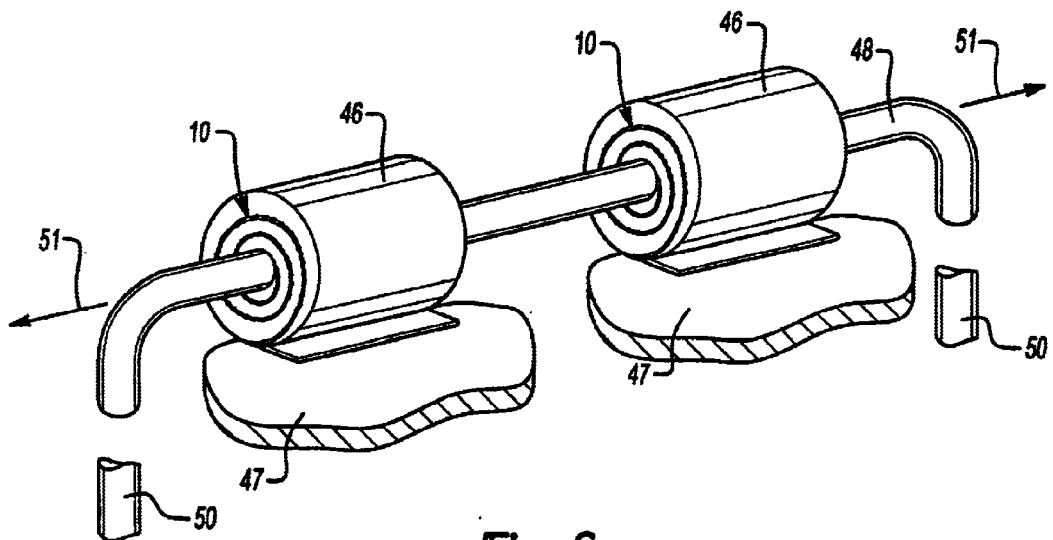
FIG. 6, is a perspective view of another application of the laminated bushing to support a stabilizer bar.

Referring to FIG. 6, in this embodiment the laminated bushings 10 secure mounting brackets 46 for a stabilizer bar 48 to direct and control movement of the stabilizer bar 48 proportionally to an applied force. The stabilizer bar 48 is mounted within the laminated bushings 10 that are in turn mounted to the body of the motor vehicle schematically shown as 47. The ends of the stabilizer bar 50 are attached to a wheel assembly (Not Shown) of the motor vehicle such that during a turn one arm of the stabilizer bar is twisted to transmit a counter rotational force across the vehicle to a side opposite the turn to inhibit roll of the body of the motor vehicle 47. The laminated bushings 10 controls the amount of rotation in proportional response to the applied forces such that a roll rate of the body of the motor vehicle 47 is controlled. In this embodiment the laminated bushings 10 can include spirally wound grooves 28 to control linear movement along an axis 51 as well as rotational movement.

Figure 7:
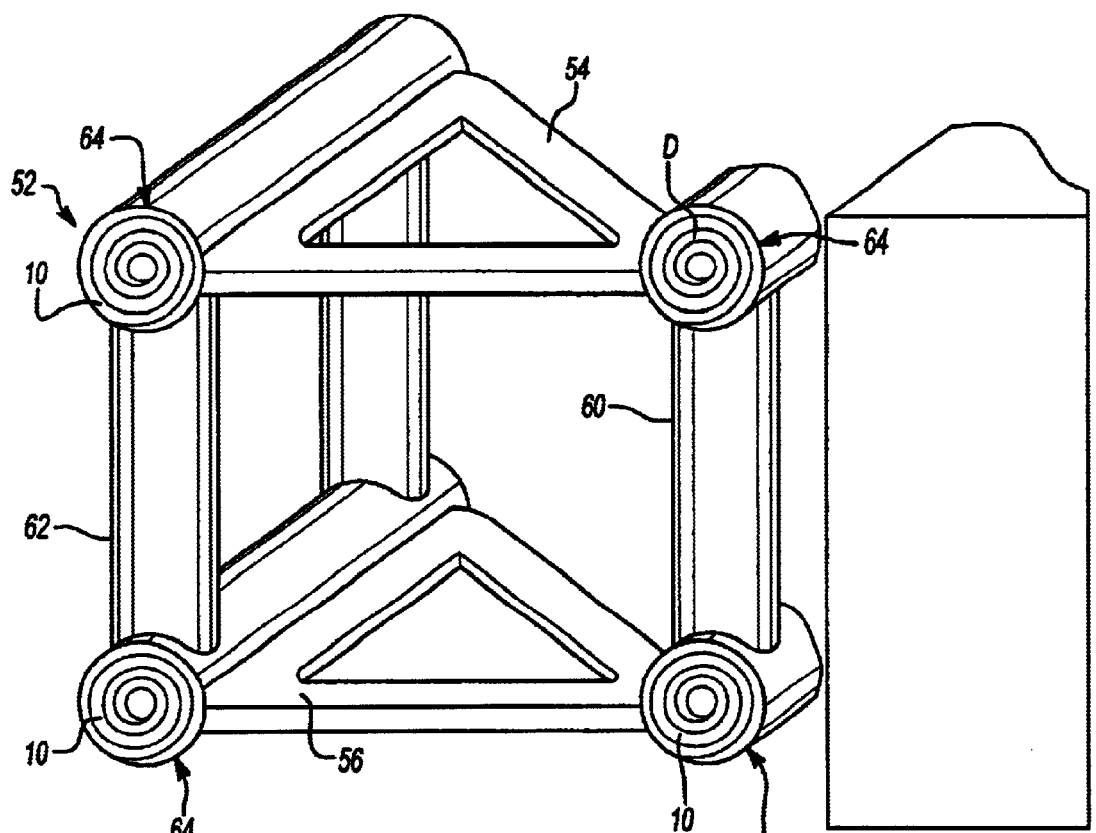
FIG. 7, is a perspective view of another application of the laminated bushing installed in upper and lower control arms of a wheel assembly.

Referring to FIG. 7, a wheel assembly 52 including upper and lower control arms 54, 56 pivotally attached to a frame member 62 at one end and to a spindle arm 60 opposite the frame member 62. Each pivotal connection 64 includes a laminated bushing 10. The laminated bushings are configured to direct and control relative movement between the upper, lower, and spindle arms 54,56, and 60 in response to forces applied to each pivotal connection 64 by movement of the wheel assembly 52.

Figure 8:
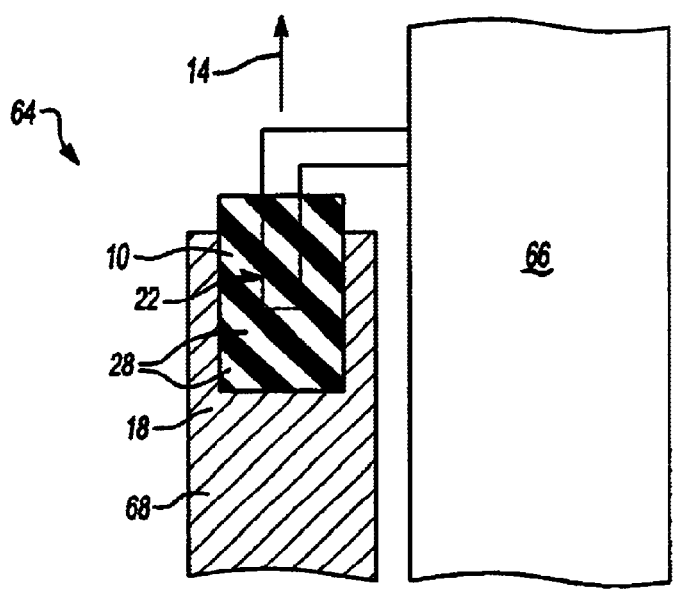
FIG. 8 is a plan view of a laminated bushing used as a hinge mechanism for a door.
Figure 9A:
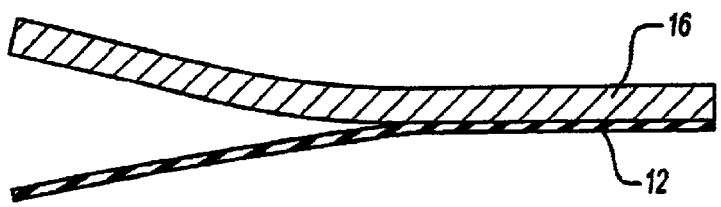
FIGS. 9A–9F are schematic views of the method steps for fabricating the spirally wound laminated bushing.
Figure 9B:
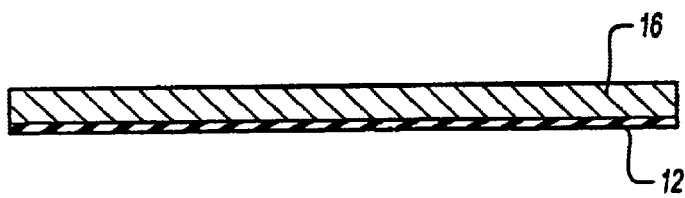
Figure 9C:
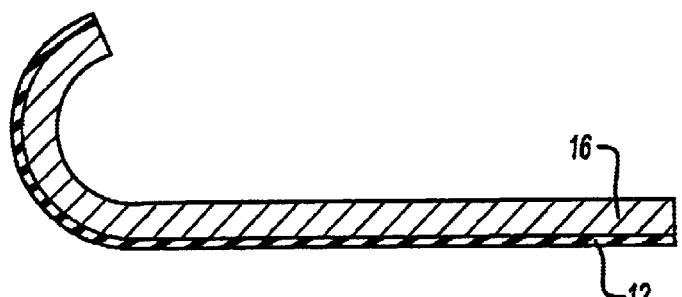
Figure 9D:
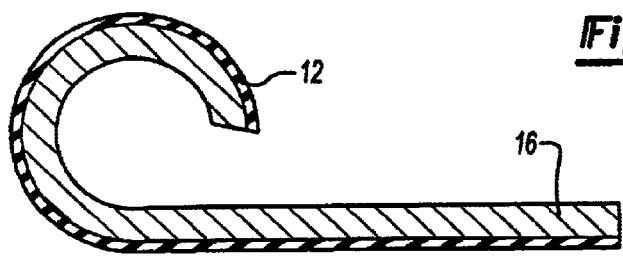
Figure 9E:
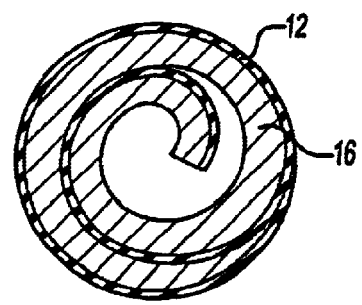
Figure 9F:
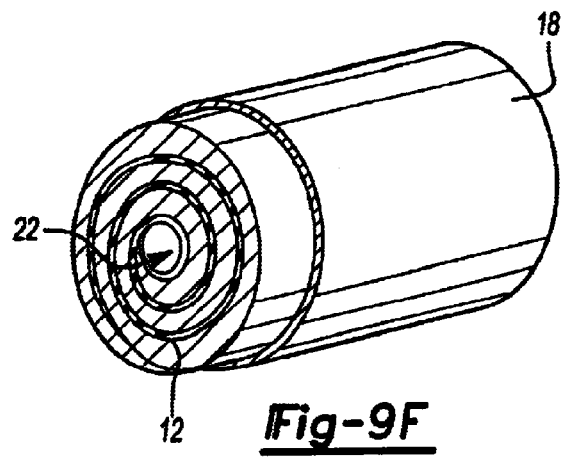

Referring to FIG. 8, another embodiment of the laminated bushing 10 is utilized as a door hinge 64 to allow directional motion of the door as well as providing a means of holding a door 66 open in various intermediate positions. The laminated bushing 10 is mounted vertically along the longitudinal axis 14 and includes spirally wound grooves 28. The laminated bushing 10 is mounted to a support 68 such that the weight of a door 66 is exerted downward onto the laminated bushing 10. The spirally wound grooves 28 are disposed on the laminated bushing 10 such that opening of the door 66 moves the inner sleeve 22 upwardly an amount proportional to the amount in which the door 66 is opened or rotated. The weight of the door 66 exerts a force downward on the laminated bushing 10 such that the door 66 will be directed to rotate toward a closed position. The downward force exerted on the laminated bushing 10 causes the door 66 to rotate toward the closed position.

Referring to FIGS. 9A–9D, the invention also includes a method of forming the laminated bushing 10 including the steps of affixing a resilient material to the metal sheet. The resilient material 16 may be affixed by any means known in the art such as utilizing adhesive or coating a metal sheet 12 with the resilient material 16. The resilient material 16 and metal sheet 12 are in turn spirally wound back about the longitudinal axis 14 to form a spirally shaped cavity 20 with the metal sheet 12 such that the resilient material 16 is disposed within the spirally shaped cavity 20. The spirally wound metal sheet and resilient material 16 is in turn inserted between an inner sleeve 22 and an outer sleeve 18. Alternatively, the metal sheet 12 maybe secured back onto itself to form the inner and outer sleeves 22,18 from a common metal sheet 12. Preferably, the inner sleeve 22 is preferably concentric with the outer sleeve 18.

The resilient material 16 is mechanically compressed within the spirally shaped cavity 20 during the winding step to form alternating layers of metal sheet 12 and resilient material 16. Alternatively, the resilient material 16 is composed of rubber and adhered to the metal sheet 12 by a vulcanization process as is known in the art. The vulcanized resilient material 16 adheres to the metal sheet 12 of the laminated bushing 10.

The method also includes the step of mechanically forming a plurality of grooves within the metal sheet. As discussed hereinabove, the grooves 24 may be of any configuration and extend in any direction. The resilient material is then adhered to the metal sheet 12 and wound to form the spirally shaped cavity 20.

Figure 10:
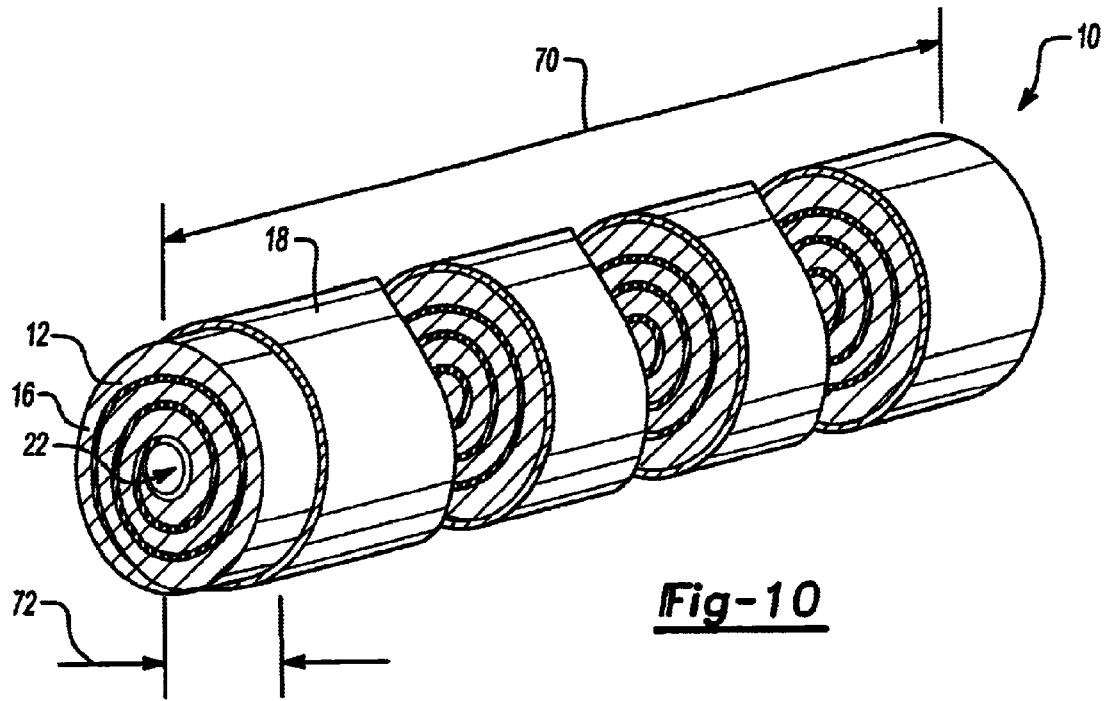
FIG. 10 is a perspective view the method step of cutting a laminated bushing to a required length.

Referring to FIG. 10, the method also includes the step of forming a length 72 of laminated bushings 10. The laminated bushing 10 maybe formed from a metal sheet having a length 70 longer than that required for a specific application, then cut into smaller required lengths 72.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason, the following claims should be studied to determine the true scope and content of this invention.

What is claimed is:

1. A laminated bushing assembly comprising;
   an inner surface and an outer surface concentric about an axis,
   a spirally shaped cavity disposed between said inner surface and said outer surface, said spirally shaped cavity defined by a metal sheet wound about said axis; and
   a resilient material disposed within said spirally shaped cavity to control relative movement between said inner surface and said outer surface, said metal sheet including a groove for varying a resistance to said relative movement depending on a direction of said relative movement between said inner surface and said outer surface.

2. The assembly of claim 1, wherein said inner surface, said outer surface and said spirally shaped cavity are formed from a common metal sheet.

3. The assembly of claim 2, wherein said resilient material is adhered to said metal sheet.

4. The assembly of claim 2, wherein said resilient material disposed within said spirally shaped cavity is mechanically compressed by said metal sheet.

5. The assembly of claim 1, wherein said resilient material is vulcanized rubber.

6. The claim as recited in claim 1, wherein said laminated bushing assembly is attachable for use in a door hinge.

7. A laminated bushing assembly comprising:
   an inner surface and an outer surface concentric about an axis;
   a spirally shaped cavity disposed between said inner surface and said outer surface, said spirally shaped cavity defined by a metal sheet wound about said axis;
   a resilient material disposed within said spirally shaped cavity to control relative movement between said inner surface and said outer surface, wherein said metal sheet includes a plurality of grooves disposed such that resistance to movement of said resilient material in a direction transverse to said grooves is greater than resistance to movement in a direction substantially parallel to said grooves.

8. The assembly of claim 7, wherein said plurality of grooves are disposed perpendicular to said axis.

9. The assembly of claim 7, wherein said plurality of grooves are disposed parallel to said axis.

10. The assembly of claim 7, wherein said plurality of grooves are disposed spirally along said axis.

11. A suspension assembly for a motor vehicle comprising;
    a mount attachable to the motor vehicle;
    a suspension member attached to said mount; and
    a laminated bushing assembly mounted between said mount and said suspension member to control movement of said suspension member relative to said mount;
    said laminated bushing assembly including a metal sheet spirally wound about a longitudinal axis to form a spirally shaped cavity including an inner and an outer surface, and a resilient material disposed within said spirally shaped cavity, said metal sheet including a groove for varying a resistance depending on a direction of movement between said inner surface and said outer surface.

12. The assembly of claim 11, where said suspension member is a leaf spring assembly.

13. The assembly of claim 11, wherein said suspension member is a wheel assembly including upper and lower control arms pivotally attached to a knuckle arm at one end and attachable to a frame member at an end opposite said knuckle arm.

14. The assembly of claim 11, wherein said suspension member is a stabilizer bar.

15. A suspension assembly for a motor vehicle comprising:
    a mount attachable to the motor vehicle;
    a suspension member attached to said mount; and
    a laminated bushing assembly mounted between said mount and said suspension member to control movement of said suspension member relative to said mount;
    said laminated bushing assembly including a metal sheet spirally wound about a longitudinal axis to form a spirally shaped cavity including an inner surface and an outer surface and a resilient material disposed within said spirally shaped cavity, wherein said laminated bushing includes a plurality of grooves disposed in said metal sheet such that resistance to movement of said resilient material in a direction transverse to said grooves is greater than resistance to movement in a direction substantially parallel to said grooves.

16. The assembly of claim 15, wherein said plurality of grooves are disposed perpendicular to said longitudinal axis.

17. The assembly of claim 15, wherein said plurality of grooves are disposed parallel to said longitudinal axis.

18. The assembly of claim 15, wherein said plurality of grooves are disposed spirally along said longitudinal axis.

19. A hinge assembly for a door comprising;

a support;

a laminated bushing assembly mounted along an axis between said door and said support to provide for rotation of said door between an open and a closed position;

said laminated bushing including an inner surface and an outer surface concentric about said axis, one of said inner surface and said outer surface attached to said support and the other of said inner surface and said outer surface attached to said door;

a spirally shaped cavity disposed between said inner surface and said outer surface;

a resilient material disposed within said spirally shaped cavity; and a plurality grooves disposed spirally along said axis in said spirally shaped cavity such that resistance to movement of said resilient material in a direction transverse to said grooves is greater than resistance to movement in a direction substantially parallel to said grooves such that said inner surface is guided axially a distance proportional to relative rotation between said inner surface and said outer surface.

20. The assembly of claim 19, wherein said axis is vertical and said spirally wound grooves direct movement of said door upward in proportion to relative rotation between said inner surface and outer surface, and a weight of said door exerted downward on said laminated bushing rotates said door toward said closed position.

* * * * *